United States Patent [19]

Chamberland et al.

[11] Patent Number: 4,498,491
[45] Date of Patent: Feb. 12, 1985

[54] THERMO-ELECTRIC VALVE

[75] Inventors: Roger R. Chamberland, Oakdale; Andrew J. Stanland, Old Lyme, both of Conn.

[73] Assignee: The United States of America as represented by the Secretary of the Navy, Washington, D.C.

[21] Appl. No.: 502,030

[22] Filed: Jun. 8, 1983

[51] Int. Cl.³ .............................................. F16K 13/04
[52] U.S. Cl. ........................................ 137/72; 441/29; 251/344
[58] Field of Search ....................... 137/72, 68 A, 344; 114/74 R, 198; 441/28, 29; 220/896, 260

[56] References Cited
U.S. PATENT DOCUMENTS

| 1,183,815 | 5/1916 | Hasty | 137/72 |
| 2,950,022 | 8/1960 | Boyer | 137/72 X |
| 3,308,046 | 3/1967 | Suleski | 114/198 X |
| 3,570,437 | 3/1971 | Davis | 441/29 X |
| 4,164,953 | 8/1979 | Naab | 137/72 |
| 4,267,854 | 5/1981 | Naab | 137/72 |

Primary Examiner—Harold W. Weakley
Attorney, Agent, or Firm—Robert F. Beers; Arthur A. McGill; Michael J. McGowan

[57] ABSTRACT

A thermo-electric valve for scuttling floating devices comprising, a cylindrical sleeve affixed to and passing through a bulkhead separating a pressurized medium on one side from a lower pressure space on the other side, a piston moveably mounted within the sleeve bore and exposed to the pressurized medium having a portion thereof blocking the sleeve bore, an O-ring sealing the gap between the piston head and the sleeve bore, a fully compressed spring pressing against the piston, a rigid dielectric washer and a low power resistor holding the piston against the spring. In operation a low current is passed through the resistor, disintegrating it which releases the spring's stored energy. This actuates the valve by expelling the piston which allows the pressurized fluid or gas to enter the lower pressure space.

15 Claims, 2 Drawing Figures

THERMO-ELECTRIC VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an electrically actuatable, bulkhead mounted valve which upon actuation permits higher pressure gas or fluid on one side of the bulkhead to flow through to the lower pressure side. More particularly, the invention relates to a valve having an O-ring sealed piston within the bore of a cylindrical sleeve and held against the force of a compressed spring by a resistive element, which element disintegrates upon application of a relatively low current thereby permitting the spring to expand and eject the piston from the sleeve bore so as to provide an opening for the fluid or gas to flow through the bulkhead to the lower pressure side.

(2) Description of the Prior Art

Most buoyant devices such as sonobuoys, communication buoys, distress buoys and the like require a scuttle after completion of their respective functions. Explosively actuated valves have been used for many years to scuttle buoys of all types. Such devices however have on occasion inadvertently exploded during storage or transportation causing serious injury to people in the immediate area. In addition some modes of transportation such as aircraft are currently not generally available due to the safety hazards associated with explosive devices. Some presently used valves employ a burn wire type actuating mechanism. These burn wire mechanisms however requires considerable time to burn through thus needing significant battery power to operate. In addition the ends of the wire are still hot and being of relatively small diameter can cause other parts to hang up. What is needed is a valve which is safe, inexpensive, reliable and actuates at low power such as that which would still be available from the battery pack of a typical buoy at the end of its service life.

SUMMARY OF THE INVENTION

Accordingly, it is a general purpose and object of the present invention to provide an electrically actuatable flood or vent valve for controlling flow of a pressurized gas or liquid through a bulkhead from a higher pressure space to a lower pressure space. It is a further object that such a valve operate quietly. Another object is that this valve actuate at low current levels. A still further object is that this valve employ stored spring energy as the means of motive power for valve actuation by piston ejection.

These objects are accomplished with the present invention by providing a thermo-electric valve for scuttling buoys, torpedoes and other such floating devices. Such valve, when selectively operated, permits control of the flow of pressurized fluid or gas from a higher pressure space to a lower pressure space. The valve comprises a generally cylindrical sleeve set into a circular opening in a pressure bulkhead separating pressurized fluid or gas on one side from a lower pressure space on the other side, a piston seated within the cylindrical sleeve bore with one end directly exposed to the pressurized fluid or gas while obstructing the opening in the bulkhead, an O-ring seal around the piston head for sealing the small clearance gap between the internal bore of the cylindrical sleeve and the diameter of the piston head, a compression spring suitable for moving the piston out of the cylindrical sleeve, a washer and a low power resistor for holding the piston against the stored force of the fully compressed spring. In operation a relatively low current is passed through the resistor. The current, although low is sufficient to disintegrate the resistor. This releases the spring's compressive energy which then actuates the valve by expelling the piston out of the bore and into the higher pressure space.

A more complete understanding of the invention and many of the attendant advantages thereto will be readily appreciated as the same becomes better understood by reference to the following detailed description when considered in conjunction with the accompanying drawings wherein:

DESCRIPTION OF THE PREFERRED EMBODIMENT

Figure 1:
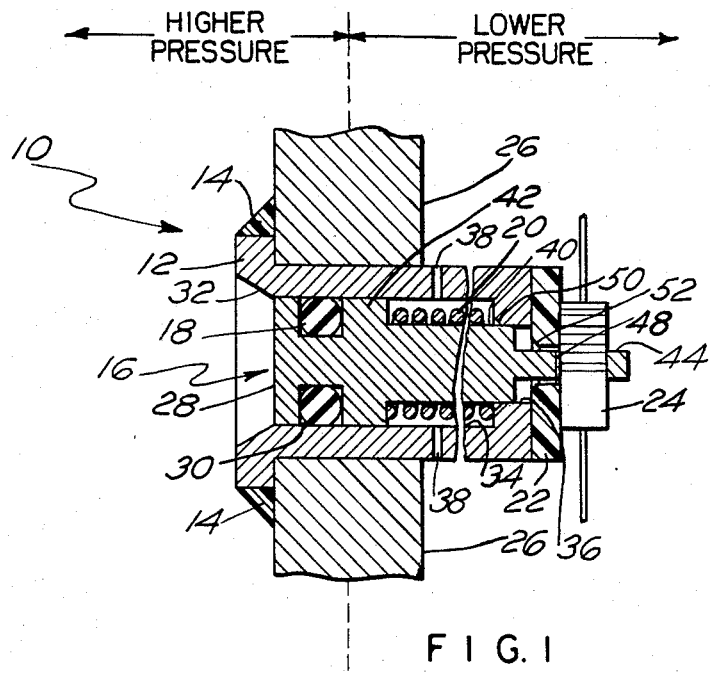
FIG. 1 shows a cross-sectional view of a thermo-electric valve built in accordance with the teachings of the present invention.

Referring now to FIG. 1 there is shown a thermo-electric valve 10 comprising a generally cylindrical sleeve 12, a sealing bead 14, a piston 16, an O-ring seal 18, a compression spring 20, a washer 22 and a low power resistor 24. Valve 10 is set into a circular hole through a pressure bulkhead 26 which bulkhead separates a higher pressure medium, i.e., fluid or gas, on one side from a lower pressure space on the other side. The pressurized medium bears against circular end surface 28 of piston 16 but cannot enter the lower pressure space through valve 10 due to O-ring 18 seated in an annular groove 30 of piston 14. O-ring 18 seals the relatively small small gap between sleeve 12 and piston 16. The pressurized medium cannot enter the low pressure space by passing between bulkhead 26 and sleeve 12 because bead 14 sealably attaches sleeve 12 to bulkhead 26. Sleeve 12 and piston 16 may be constructed of either metal or plastic depending on the pressures expected in service and/or the physical characteristics of the pressurized medium of interest. Sealing bead 14 may be epoxy or the like, or in cases where sleeve 12 is metal may be a suitable weld metal. Washer 22 must be a rigid, dielectric material, such as nylon, Fiberglass or the like in order to prevent a metal sleeve from acting as a heat sink and also to prevent shorting of wire leads. Where the sleeve is plastic the washer may be omitted. Resistor 24 may be any low power resistive device which will disintegrate upon application of a relatively low current, e.g., a 16 ohm, ¼ watt carbon type resistor. Sleeve 12 further comprises a flange at the higher pressure end. This flanged end has a chamfer 32 on the leading edge of sleeve 12's internal bore 34 to facilitate passage of O-ring 18 into bore 34 and to provide smooth fluid flow. The lower pressure end of sleeve 12 has an aperture 36 through it, the diameter of sleeve aperture 36 being somewhat less than the diameter of bore 34. Aperture 36 may have a chamfer 50 on the internal edge for smooth fluid or gas flow. Sleeve 12 may extend well beyond bulkhead 26 on the lower pressure side. Also, if greater flow is desired a plurality of apertures 38 may be provided at the lower pressure end of sleeve 12. Piston shaft 40 and spring 20 would then be extended accordingly. Piston 16 further comprises shaft 40, a head 42 with higher pressure end surface 28 and tang 44. The head portion has a diameter slightly less than the diameter of bore 34 to permit sliding motion of piston 16 in bore 34 and a face 46 formed at the junction of head 42 and shaft 40. In addition, piston head 42 has machined therearound annular O-ring groove 30. Piston shaft 40 has a diameter less than piston head 42 in order to provide a clearance between bore 34 and shaft 40 which accommodates the diameter of compression spring 20. Sleeve aperture 36 is sized to accept shaft 40 while providing a slip fit therebetween. The low pressure end of piston 16 has a flat tang 44 having aperture 48 passing through it such that when piston 16 is fully inserted within sleeve 12 against spring 20, tang aperture 48 fully extends beyond rigid washer 22 permitting resistor 24 to be inserted for holding piston spring 20 in compression.

Washer 22 provides support for resistor 24 in an assembled valve while also providing thermal insulation. The internal bore diameter or slot size of washer 24 and the diameter of aperture 36 may be different or the same and where metered fluid/gas flow is desired hole size is chosen accordingly. Washer 24 may also have a chamfer 52 on the side facing the higher pressure space and may be bonded to the end of sleeve 12 or held in place by spring force.

Figure 2:
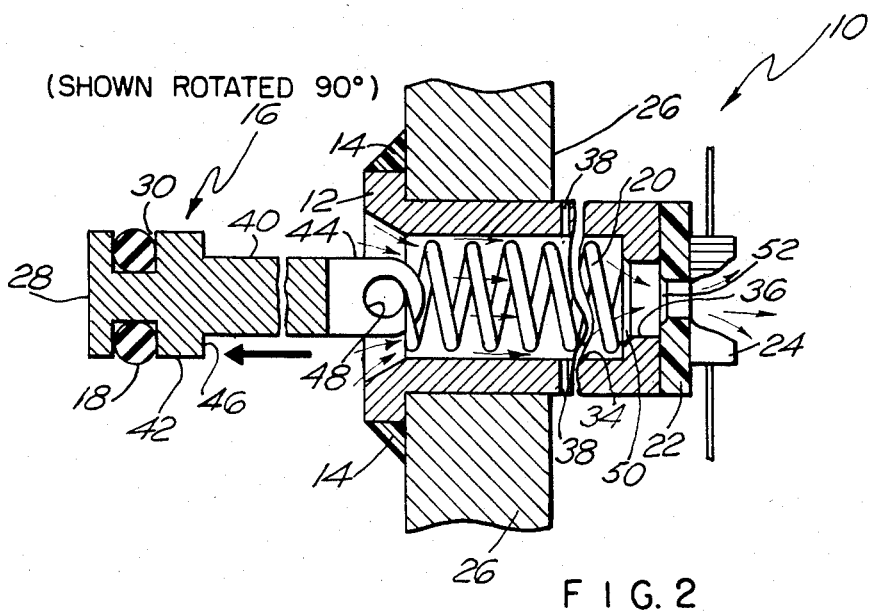
FIG. 2 shows the valve of FIG. 1 shortly after actuation of the device.

FIG. 2 shows thermo-electric valve 10 after the valve has been actuated by application of a relatively low amperage current through resistor 24. Piston 16 is shown rotated 90 degrees in FIG. 2 to better illustrate tang aperture 48. By way of example, to selectively actuate a valve assembly 10 having a ¼ watt resistor, a low current, e.g., one ampere or more, is allowed to pass through resistor 24. At one ampere, 16 watts of power must be dissipated by the ¼ watt resistor. Since resistor 24 is unable to dissipate the heat generated rapidly by the excessive current passing through it, it disintegrates. Piston 16 is then no longer restrained by resistor 24, so compression spring 20 releases its stored energy and ejects piston 16 into the pressurized medium thereby permitting fluid or gas to enter the lower pressure space through bore 34 of sleeve 12 thereby scuttling the previously buoyant device. A second valve 10 is used for venting the low pressure space where necessary to flood a buoyant device when scuttling.

It should be noted that selection of resistor 24 wattage rating will depend on battery power expected to be available. In view of the shear forces placed on this selected resistor 24 by tang 44, spring 20 is then sized so as not to cause mechanical failure of resistor 24. Conversely, to permit proper ejection of piston 16 against the pressurized medium, spring 20 must have enough stored energy in the compressed state to overcome the force of the pressure over piston end surface 28. This requires choice of a suitable physical size resistor 24 which can hold the compression forces of spring 20. Thus the resistor/spring combination may be tailored to suit expected operating conditions. Valve 10 may be large or quite small depending on expected remaining battery power and the pressure value. For low pressure, resistors of ⅛ watt or the like will suffice allowing valve diameters on the order of ½ inch.

One advantage of the instant invention is that low actuation power such as the residual power remaining in a buoy battery package is sufficient. This allows use of simpler, less expensive driver electronics resulting in a more reliable valve. In addition, the present device requires no explosive charge to actuate the piston, rather it is electromechanically actuated using a minimum number of moving parts and, by circumventing explosive actuation, is significantly safer during transport and handling by personnel as well as quieter during operation. Because valve 10 has a minimal number of moving parts the system cost is kept low. This is an advantage in view of the inherent requirement that a scuttling valve be expendable. The primary new feature of this invention is the low power resistor/compression spring actuation mechanism trippable by low current on demand.

What has thus been described is a thermo-electric valve for scuttling buoys, torpedoes, and other such floating devices which, when selectively operated, permits a pressurized medium to enter a lower pressure space. The valve comprises a metal or plastic generally cylindrical sleeve set into an opening through a pressure bulkhead separating fluid/gas on one side from a lower pressure space on the other side, a piston seated within the cylindrical sleeve which has one end exposed to the pressurized medium thereby blocking the opening in the dividing wall, an O-ring seal around the piston diameter which sealably contacts the internal bore of the sleeve, a compression spring suitable for moving the piston relative to the sleeve, a washer and a low power resistor. A relatively low current, significantly greater than the resistor rating, is passed through the resistor disintegrating it. This releases the spring's compressive energy actuating the valve by expelling the piston into the higher pressure space.

Obviously many modifications and variations of the present invention may become apparent in light of the above teachings. For example: the piston material may be any suitable plastic or metal. The sleeve may be sealably attached to the bulkhead using a threaded connection, screws through the outer sleeve flange or a continuous weld bead of suitable metal. The valve may be used for other purposes than scuttling, e.g., as a precision metering valve or for any inter-chamber fluid transfer.

In light of the above, it is therefore understood that within the scope of the appended claims, the invention may be practiced otherwise than as specifically described.

What is claimed is:

1. A thermo-electric valve for scuttling buoyant devices comprising:

a cylindrical sleeve, adapted to be inserted through an aperture in a bulkhead separating a pressurized medium in a higher pressure space from a lower pressure space, said sleeve further including a flanged higher pressure end, an internal bore therethrough and a lower pressure end having a surface extending into said bore such that a smaller diameter aperture than said bore is formed thereby providing a lip at the low pressure end of the bore, said low pressure end extending beyond the low pressure surface of said bulkhead;

a piston, slidably insertable into said sleeve bore, said piston further including a cylindrical shaft having a larger diameter head at the end of said piston shaft facing said higher pressure space, said piston head having an annular groove thereabout, and said shaft having a tang on the opposite end thereof, said tang having a circular aperture therethrough;

a compression spring, the outer diameter of which is selected to moveably fit within said sleeve bore, while the inner diameter thereof is selected so as to slip over said piston shaft such that one end of said spring rests against said sleeve lip and the opposite end thereof rests against the face formed by the difference in diameters of said piston shaft and said piston head;

an O-ring, selected so as to mount within said piston head annular groove, for providing an occlusive seal between said piston head diameter and said sleeve bore thereby preventing said pressurized medium from entering said low pressure space;

a rigid, dielectric washer, placed against the exterior surface of said low pressure end of said sleeve, said washer having an aperture therethrough, the diameter of which is selected to permit said piston tang to extend therethrough when said piston is totally inserted within said bore to fully compress said spring, the full area of said tang aperture extending beyond said washer;

a low power resistor, adapted to receive low control circuit current, said resistor having a diameter such that said resistor may be inserted through said tang aperture said resistor resting against said washer thereby holding said spring in compression within said sleeve bore; and a sealing bead, sealably attaching said sleeve flange to said bulkhead;

whereby, upon application of said low current to said resistor, said resistor disintegrates thereby releasing the stored energy of said spring whereupon said spring expands and ejects said piston into said higher pressure space thus permitting said pressurized medium to flow through said sleeve bore and said sleeve aperture into said low pressure space.

2. A thermo-electric valve according to claim 1 wherein said washer is nylon.

3. A thermo-electric valve according to claim 2 wherein said sleeve bore further includes a chamfer on the leading edge of said bore for providing smooth flow of said pressurized medium and to protect said O-ring during insertion thereof.

4. A thermo-electric valve according to claim 3 wherein said resistor is a carbon type.

5. A thermo-electric valve according to claim 4 wherein said sleeve aperture further includes a chamfer on the internal edge of said lip.

6. A thermo-electric valve according to claim 5 wherein said washer further includes a chamfer on the higher pressure side of the aperture thereof.

7. A thermo-electric valve according to claim 6 wherein said sleeve is metal.

8. A thermo-electric valve according to claim 7 wherein said sealing bead further comprises epoxy material.

9. A thermo-electric valve according to claim 7 wherein said sealing bead further comprises weld metal compatible with said metal sleeve.

10. A thermo-electric valve for scuttling buoyant devices comprising:
a cylindrical sleeve of dielectric material, adapted to be inserted through an aperture in a bulkhead separating a pressurized medium in a higher pressure space from a lower pressure space, said sleeve further including a flanged higher pressure end, an internal bore therethrough and a lower pressure end having a surface extending into said bore such that a smaller diameter aperture than said bore is formed thereby providing a lip at the low pressure end of the bore, said low pressure end extending beyond the low pressure surface of said bulkhead;

a piston, slidably insertable into said sleeve bore, said piston further including a cylindrical shaft having a larger diameter head at the end of said piston shaft facing said higher pressure space, said piston head having an annular groove thereabout, and said shaft having a tang on the opposite end thereof, said tang having a circular aperture therethrough;

a compression spring, the outer diameter of which is selected to moveably fit within said sleeve bore, while the inner diameter thereof is selected so as to slip over said piston shaft such that one end of said spring rests against said sleeve lip and the opposite end thereof rests against the face formed by the difference in diameters of said piston shaft and said piston head;

an O-ring, selected so as to mount within said piston head annular groove, for providing an occlusive seal between said piston head diameter and said sleeve bore thereby preventing said pressurized medium from entering said low pressure space;

said low pressure end aperture having a diameter selected to permit said piston tang to extend therethrough when said piston is totally inserted within said bore so as to fully compress said spring, the full area of said tang aperture extending beyond said low pressure end of said sleeve;

a low power resistor, adapted to receive low control circuit current, said resistor having a diameter such that said resistor may be inserted through said tang aperture said resistor resting against said sleeve low pressure end thereby holding said spring in compression within said sleeve bore; and a sealing bead, sealably attaching said sleeve flange to said bulkhead;

whereby, upon application of said low current to said resistor, said resistor disintegrates thereby releasing the stored energy of said spring whereupon said spring expands and ejects said piston into said higher pressure space thus permitting said pressurized medium to flow through said sleeve bore and said sleeve aperture into said low pressure space.

11. A thermo-electric valve according to claim 10 wherein said sleeve is nylon.

12. A thermo-electric valve according to claim 11 wherein said sleeve bore further includes a chamfer on the leading edge of said bore for providing smooth flow of said pressurized medium and to protect said O-ring during insertion thereof.

13. A thermo-electric valve according to claim 12 wherein said resistor is a carbon type.

14. A thermo-electric valve according to claim 13 wherein said sleeve aperture further includes a chamfer on the internal edge of said lip.

15. A thermo-electric valve according to claim 14 wherein said sealing bead further comprises epoxy material.

* * * * *